Aug. 21, 1956     C. D. MOTT     2,760,044
METHOD OF ARC WELDING
Filed Jan. 9, 1952     3 Sheets-Sheet 1
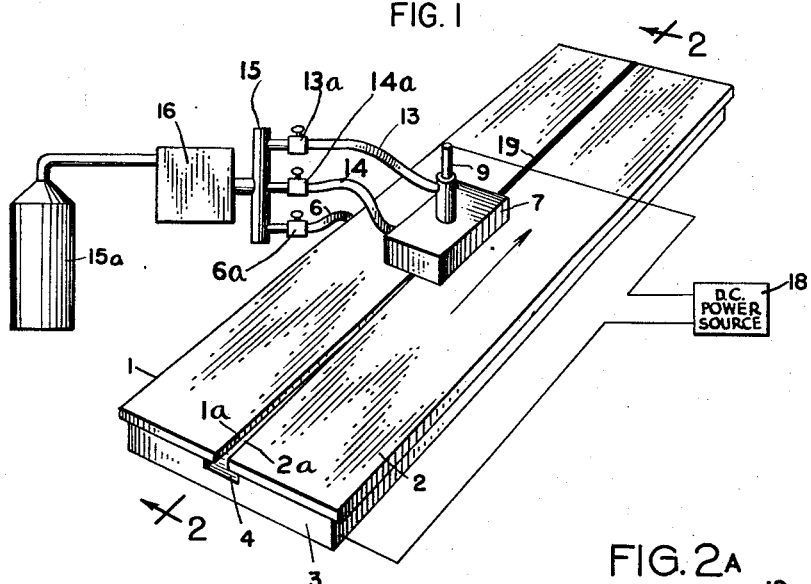
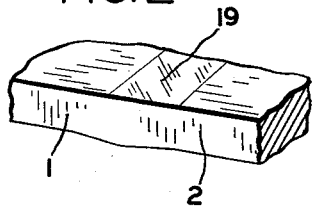
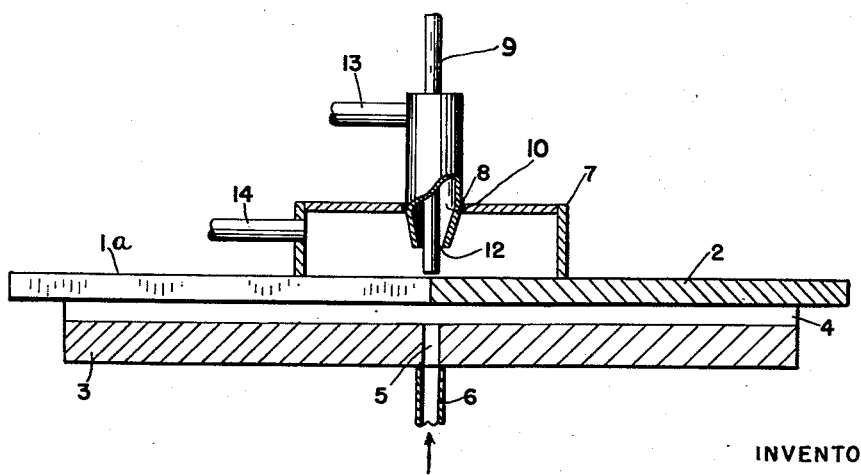
INVENTOR.
CHESTER D. MOTT
BY
Schneider & Dressler
ATTY'S.

Aug. 21, 1956 C. D. MOTT 2,760,044
METHOD OF ARC WELDING
Filed Jan. 9, 1952 3 Sheets-Sheet 2

INVENTOR.
CHESTER D. MOTT
BY.
Schneider & Dressler.
ATTY'S.

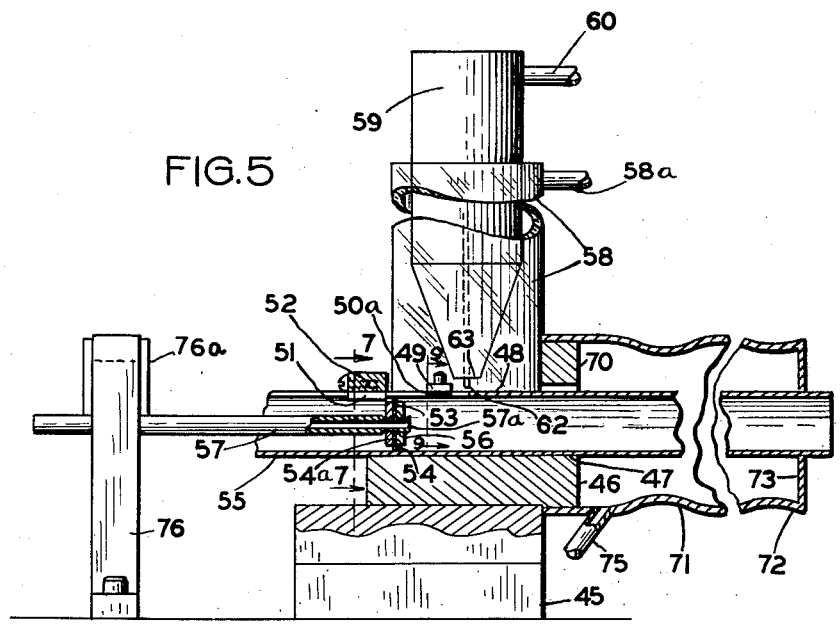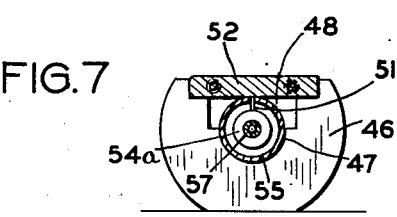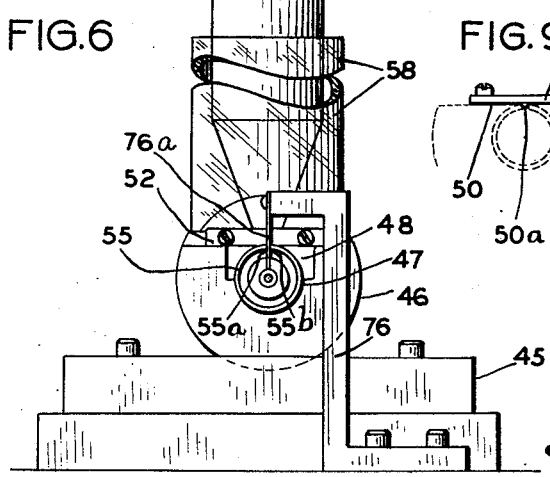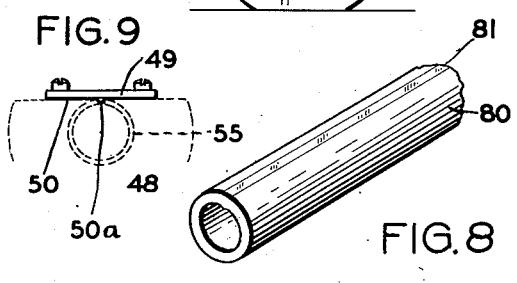

United States Patent Office 2,760,044
Patented Aug. 21, 1956

2,760,044

METHOD OF ARC WELDING

Chester D. Mott, Evanston, Ill., assignor to Fansteel Metallurgical Corporation, a corporation of New York Application January 9, 1952, Serial No. 265,688

7 Claims. (Cl. 219—10)

This invention relates to the art of arc welding and particularly to a method of arc welding of tantalum and to product of such method. While the invention is particularly useful with tantalum and will be described in connection with that metal, the new method may be used with other metals than tantalum. Thus, for example, columbium, molybdenum and zirconium have about the same problems and difficulties in connection with the production of strong, tough, and satisfactory welds. Additionally, certain metals like silver, stainless steel, and nickel may also be advantageously welded by the hereinafter described method to produce strong welds of great purity and free from contamination.

As is known, at temperatures in excess of about 400 degrees C. it is necessary to protect tantalum against contamination and its tendency to react with gases, vapors and other metals. The high melting point of tantalum, about 3000 degrees C., together with the strong tendency of hot solid or molten tantalum to alloy with, or be contaminated by, other metals, solids and gases, makes it impossible to use known welding technique.

The above characteristics of tantalum to combine chemically with other elements and compounds has even made it necessary to obtain metallic tantalum from its ores in a manner different from the conventional methods of handling metals such as iron, copper and the like. Because of its great affinity for other elements, it has been necessary to rely upon powder metallurgy technique, in processing tantalum. Thus pressed tantalum bars must be sintered in a high vacuum to prevent absorption of gas and production of brittle, non-ductile tantalum. The tantalum metal itself must be cold-worked and maintained below about 400 degrees C. Whatever annealing of tantalum is necessary, to eliminate the cold work hardening of the metal, must be done in a vacuum or in an inert atmosphere.

The inability to produce satisfactory welds of tantalum metal has greatly militated against the more extensive use of this metal. Thus the use of tantalum has been restricted generally to comparatively thin and small articles. As an example, electrodes, such as anodes for vacuum tubes, have been made of sheet tantalum metal. The metal used for making such electrodes is thin and has been welded after a fashion. Resistance welding under water of thin tantalum sheets has been used in connection with the manufacture of such vacuum tube anodes. An alternative method of welding has relied upon an arc with a carbon electrode, the arc being immersed in a non-oxidizing liquid such as carbon tetrachloride.

Welds resulting from the above methods have been unsatisfactory because of brittleness, gas pockets and lack of strength. Such welds are, in general, so weak and brittle that it is impossible to work the welded article without danger of fracturing the weld.

Attempts have also been made to apply conventional inert atmosphere welding techniques to tantalum welding. Such attempts, however, have been fraught with failure and have produced welds which were generally no better than the welds previously described.

This invention makes it possible to obtain continuous welds of any desired length and extent, the welds having substantially the same physical characteristics of ductility, flexibility and toughness as characterize annealed metallic tantalum. The new and improved method provides a new weld characterized by a density and crystalline structure generally resembling the main body of tantalum metal, and an article or sheet containing the weld may be handled and worked upon in any desired manner as if the weld did not exist.

The new method contemplates the maintenance of a gently moving inert atmosphere enveloping all molten and hot tantalum during arc welding thereof with a suitable electrode, the tantalum itself being physically separated, while it is molten or hot, from any contaminating solid material. The inert atmosphere should move slowly enough at the surface of the molten pool of tantalum so that surface chilling of the pool is avoided. Yet the movement of inert atmosphere should suffice to purge, and maintain purged, the gaseous atmosphere in which the molten and hot tantalum lies, of impurities originating in the electrode or weld materials. The pressure of the inert atmosphere should be low, just enough above atmospheric pressure to prevent leakage of air into the inert welding atmosphere.

In the case of tantalum, an inert atmosphere may be provided by using any one or a mixture of inert monatomic gases, such as argon, helium, neon, krypton or zenon. Of these gases, helium is preferred for the reason that it is readily available. Furthermore, helium has desirable cooling properties, this being useful when the helium bathes the surface of the hot but finished weld.

The region where the welding occurs, if confined, must be designed so that no dead or stagnant gas pockets can form. In my invention, the entire welding region is washed by an ever changing inert atmosphere. For the maintenance of a proper inert atmosphere, it is preferred to introduce the inert gas at a number of spaced points within the region to be occupied by the gas. In the event that there are no hermetic seals between relatively movable parts—this being the usual condition—it is preferred that any inert gas introduced in the vicinity of such region have a velocity which is so low as to avoid aspirating air into the confined region to be filled with an inert atmosphere. The slow gas velocity may be obtained by providing a sufficiently large inlet area into the confined region so that a sufficient volume of gas can be introduced.

An electrode of material which is relatively stable under welding conditions must be used. Such an electrode should have as high a melting point and as low a vapor pressure as possible under welding conditions. As a result, consumption of the electrode during welding is reduced to a minimum. In tantalum welding, such electrode may consist of tungsten or tantalum, preferably the former. The arc is preferably a direct current arc with the electrode functioning as a cathode. The requirement for a direct current arc, however, does not necessarily mean that the current must be free from substantial ripple. The ripple component may be as great as desired and in practice, rectified alternating current without filtering is sufficient.

Generally, it is preferred to initiate the arc in space between the electrode and the weld metal, such as tantalum, without physical contact between the electrode and weld metal. Various means for accomplishing this are known, these generally involving the use of high frequency, high potential discharges to initiate an arc, after which a conventional low voltage arc will be established and may be maintained. The arc potential will depend upon the nature of the inert atmosphere. With helium, for example, the arc potential will be around 18-25 volts.

In conventional welding, there is provided a chill bar or chill plate of suitable material upon which the parts being welded are disposed and supported. This chill bar or chill plate not only functions in a mechanical sense for supporting and clamping purposes, but also provides heat radiating means for dissipating some of the heat generated during welding.

Because of the high melting point of tantalum and because of the great affinity that tantalum, at elevated temperature, has for metals and solids generally, I have dispensed with such chill bar or chill plate. Instead, I prefer to arrange the tantalum to be welded in such a manner that the tantalum metal is self supporting at the region of weld and for a sufficient distance from the weld, so that the tantalum is free of support by other material so long as its temperature is high enough to enable it to react with, or alloy with, solid metals and materials.

It is evident from the absence of a chill plate in tantalum welding, that substantially all of the heat at the weld must be dissipated either by conduction through the tantalum or to the inert atmosphere or by radiation. Inasmuch as in conventional welding a substantial amount of heat is dissipated by conduction through the chill plate, such conventional welding can tolerate substantial variations in heat energy input to the weld. In the case of tantalum welding, and particularly where thin stock is involved, some care will have to be exercised to prevent excessive melting of tantalum. This may be accomplished by controlling the electric energy to the arc or by controlling the speed of welding, if continuous welding is involved, or both.

Because of the capillary force existing at the surface of the molten pool of tantalum between the tantalum edges being welded, substantial variation in the size of the pool is possible without serious impairment of the character of the weld. Hence the maintenance of proper arc conditions is not difficult.

The welding of tantalum differs markedly from the welding of other metals and alloys in the manner in which the opposing edges or surfaces to be welded are handled. As is well known, conventional welding technique makes it necessary for the parts being welded to be clamped or tightly pressed together. In distinction to this, the welding of tantalum is unique in that clamping of opposed edges to be welded is not only unnecessary but undesirable. I have found that during the welding of tantalum, powerful forces are created tending to pull the opposing edges at the weld together. These forces are sufficiently strong so that during the progress of a weld, there is a tendency, particularly when thin sheets are involved, for one sheet to climb over and overlap the other sheet. This pulling together is made use of in one of the new methods of welding by leading the opposed edges toward each other at a slight angle whereby a straight weld with aligned edges results.

For the first time, it is now possible to obtain a tantalum weld and tantalum welded article, the weld portion of which has substantially the same physical characteristics of density, toughness and ductility as annealed tantalum.

In order that the invention may be explained, exemplary embodiments of apparatus with which the new methods may be practiced and also finished welds of tantalum will now be described; it is understood, however, that the drawings merely show examples and that substantial variations may be made depending upon conditions encountered and upon the metal being welded.

Referring therefore to the drawings:

Figure 1 is a perspective view, partly in diagrammatic form, illustrating apparatus with which a method of butt welding may be practiced;

Figure 2 is a section upon line 2—2 of Figure 1;

Figure 2A is a detail of a finished butt weld;

Figure 5 is a view, partly in section, of a mechanism with which a method of welding tantalum pipe may be used;

Figure 6 is a front view of the mechanism of Figure 5;

Figure 7 is a sectional detail on line 7—7 of Figure 5;

Figure 8 is a detail of a piece of welded tantalum pipe; and

Figure 9 is a sectional detail on line 9—9 of Figure 5, showing the hold-down block.

Figure 3:
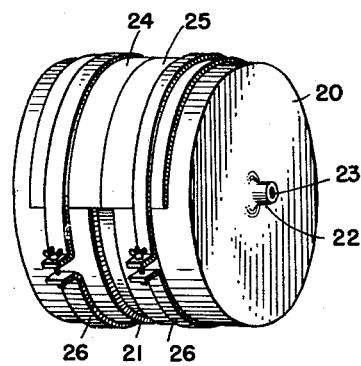
Figure 3 is a perspective view of apparatus for maintaining a pair of metal members in curved abutting relationship in preparation for welding by a modified method of welding.

Referring now to Figures 1 and 2, sheets or plates 1 and 2 are of the metal to be welded. Thus sheets 1 and 2 may be of tantalum. These sheets are supported upon suitable plates 3 of iron, copper, brass or any other desired material. It is understood that the portions of sheets 1 and 2, which are to be welded, are clean and free of dirt, grease, or the like. These portions, and in fact the neighboring portions which are likely to become hot, are preferably cleaned with emery cloth or wire brush or any other suitable means so that the metal surface is clean.

Support plate or bed 3 may have any desired configuration, depending upon the dimensions of sheets 1 and 2, the gauge of metal and other factors as cooling means for support 3. However, support 3 is provided with longitudinal groove 4 for a substantial distance below the weld line so that material 3 will not be in physical contact with sheets 1 and 2 at the welding point and for as long as the weld junction remains hot enough to be contaminated by other metals or materials. In general, however, support 3 should be so designed and groove or channel 4 should be so dimensioned that the portions of sheets 1 and 2 which are being handled for welding are self-supporting. It is preferred, generally, to have groove 4 symmetrical with respect to the weld junction although this is not essential.

Sheets 1 and 2 have opposed edges 1a and 2a which are to be welded together. The opposed edges 1a and 2a are preferably disposed at an angle toward each other, the edges intersecting at or near the welding regions and the edges diverging from each other away from the weld region and in advance thereof. This angle may vary within limits, depending upon the gauge of metal; but in general, in the case of tantalum, the angle is small and is of the order of about one degree. Suitable means for holding the sheets at cool portions may be provided to maintain their position.

Support member 3 is provided with inlet 5 immediately below the welding region and this inlet 5 together with pipe 6 permits of the introduction of inert gas in region or groove 4. It is not necessary to have the chamber formed by groove 4 hermetically sealed. This means that sheets 1 and 2 may simply rest upon support plates 3 and may be moved relatively thereto as welding progresses.

Supported over sheets 1 and 2 and defining a welding region is hood 7 of suitable material. Such material may be of metal, such as steel or copper, or of quartz or high melting glass such as the borosilicate glass sold in the trade under the name of Vycor. As shown, hood 7 lies over a portion of the opposed edges 1a and 2a. Suitably supported by hood 7 is electrode-retainer 8, preferably of metal such as iron or copper. Electrode-retainer 8 supports electrode 9 therein, this electrode being of suitable material for proper welding. In the case of tantalum welding, electrode 9 is preferably of tungsten though tantalum may be used. Both metals have low vapor pressures and high melting points. Electrode-retainer 8 is preferably so designed as to maintain electrode 9 in predetermined position and provides chamber 10 around a substantial portion of the electrode with the electrode tip portion protruding below mouth 12 of the electrode-holder. It is understood that electrode 9 is electrically insulated from sheets 1 and 2, as by choice of hood material or electrode mounting. Electrode holder 8 has coupled thereto gas conduit 13, this being adapted to supply inert gas to chamber 10, formed by electrode-holder 8, such inert gas flowing down around the lower portion of the electrode and emerging inside the hood through mouth 12.

It is preferred to dispose electrode-holder 8 and electrode 9 so that they pass through the top wall of hood 7 and extend down toward the work. However, other arrangements of electrode-holder and electrode are possible and may be used.

Hood 7 is provided with gas supply pipe 14, this pipe preferably passing through a part of the hood spaced from the immediate region of the arc. In all cases, no chilling blast of gas should be directed at the molten pool.

Gas pipes 6, 13 and 14 are connected through suitable valves 6a, 13a and 14a to manifold 15. Manifold 15 is supplied with inert gas from container 15a, the inert gas supply system also including gas dryer 16 of suitable construction. It is necessary that the inert gas be substantially pure and free of moisture since that is a contaminant.

The various regions defined by hood 7 and chamber 4 in which there is an inert atmosphere for enveloping hot tantalum should be so designed that all tantalum at or above about 400 degrees C. shall remain in the protecting inert atmosphere. Thus, if the temperature of the tantalum beyond the region of support by member 3 is above about 400 degrees C., then it will be necessary to design an enclosure for the inert atmosphere which will cover support 3.

In all cases of welding of tantalum, two sources of contamination of tantalum may be present. One source is the atmosphere in which the tantalum lies, and the critical temperature for this is about 400 degrees C. The other source is the support material for the tantalum. The critical temperature for this will vary depending upon the nature of support material and cooling provisions, but in general will be well above 400 degrees C.

It is, of course, possible to provide the inert atmosphere as a free cloud of gas, without an enclosure. But it will be difficult to control the movement of gas along the tantalum pool and as a result there may be chilling of the pool surface. For other metals having lower melting points, the free cloud of gas may be practical.

Suitable connections are made to electrode 9 and support 3 or sheets 1 and 2, as desired. These electrical connections are supplied with welding current from source 18. Source 18 provides direct current having constant or variable potential, and the polarity is such that electrode 9 is the cathode or negative electrode. By virtue of this arrangement, most of the heat of the arc will be concentrated at the weld.

If the electrical connections are reversed, tantalum welding is inefficient and consumption of electrode material will be substantially increased. To a less degree, the same is true of alternating current. Source 18 preferably includes means for impressing an initial high potential surge between electrode 9 and plates 1 and 2 to initiate an arc. After initiation of an arc, the negative resistance characteristics of an arc permit the flow of heavy current at a comparatively low potential.

As has been generally pointed out before, in the case of tantalum welding, the metal at the weld, indicated by 19 in Figure 1, tends to shrink and pull in toward each other the opposing edges of sheets 1 and 2. Because of this tendency, it is preferred to feed edges 1a and 2a toward each other at a slight angle whereby this tendency results in abutting welded edges. It is, of course, possible to have edges 1a and 2a abut as in normal welding of iron or the like and apply suitable force to sheets 1 and 2, as by clamps, to prevent relative movement of the sheets and avoid overlap.

During welding, it is necessary for the arc to progress along edges 1a and 2a, which are to be welded. This progression may be obtained by moving either hood 7 and its accessories, with respect to sheets 1 and 2, or moving sheets 1 and 2 with respect to hood 7, or both. Once welding conditions have reached an equilibrium, it will be found that the arc may travel along the edges to be welded at a steady rate to produce a continuous, homogeneous line weld. The rate at which the arc travels with respect to the opposed edges will depend upon the intensity of the arc. Thus, within limits, the greater the arc intensity the faster the arc may travel along the surface of the metal.

During welding, inert gas is fed to pipes 6, 13, and 14, this inert gas leaking out from groove 4 and from hood 7. If the temperature of tantalum sheets 1 and 2 is too high for hood 7 to rest upon them, the hood may be suspended to provide a slight clearance. It is understood that an inert atmosphere, both above and below sheets 1 and 2 near the weld region, will be provided prior to initiation of any arc. It is necessary that the inert gas fed into electrode-holder 8 travel at a sufficiently low velocity to prevent aspiration of air around electrode 9. Also it is important that the inert gas emerging at mouth 12 travel slowly enough so that no cold blast of inert gas will be directed at the molten pool immediately below the electrode tip and thus cause the surface thereof to be chilled. Because of the high temperature of the molten pool, preheating of the inert gas will accomplish little. For other metals having a lower melting point, preheating may be beneficial.

As is true of welding generally, it is necessary that molten metal cool from the bottom, if a good strong weld is to result. It is possible to adjust gas valves 6a, 13a and 14a so that slow trickles of gas enter the welding region around the arc and travel throughout the region beneath hood 7 and groove 4. Thus the inert gas washes away any gas or vapor impurities generated by or because of the arc.

I have found that, using helium in the case of tantalum welding, a gas flow of between about one-half and about two and one-half cubic feet per second is adequate. Best results are secured by using approximately the median value of this gas flow. The pressure of the gas is just enough above atmospheric pressure so that the inert gas will prevent air from flowing to the hot metal, the inert gas itself leaking out slowly to atmosphere. Thus a pressure of one or two inches of water is satisfactory. With gases other than helium and having inferior cooling properties, it may be found that a somewhat greater flow of gas may be tolerated without adverse effects on the molten pool of tantalum.

The finished weld itself will be found generally to have a thickness somewhat greater than the thickness of sheets 1 and 2, assuming these sheets to be of equal thickness and that no additional metal is supplied. This is shown in Figure 2A, where sheets 1 and 2 have been welded. The top surface of weld 19 is generally flush with the top surfaces of the sheets. The bottom surface of weld 19 bulges downwardly. The weld surface has a silvery, smooth sheen and gives the appearance of having been polished. Physically, the weld is dense and tough and is similar to annealed tantalum. The crystals in the weld are somewhat longer than in annealed sheet tantalum.

In the course of welding, there is created a pool of molten tantalum which is supported between the opposed edge portions of tantalum. It is my belief that the force due to surface tension of the liquid tantalum is high so that the pool will tend to maintain itself in position in spite of substantial variations in pool size. If too large an area of tantalum is melted, the pool will not be self-supporting. However, if the pool does not extend through the thickness of the tantalum, then the entire thickness of tantalum metal at the joint may not be welded. In such case, it is possible to butt weld the edges of the tantalum on one side of the sheets for a certain depth of the tantalum sheets. Thereafter, the sheets may be turned over and welding accomplished on the other side of the abutting edges so that the entire thickness of tantalum metal will be welded.

Where small sheets of tantalum are to be welded or where the ends of pipes are to be butt welded, a different method of handling the material may be used with advantage. Particularly, in case where small thin pieces of sheet metal are being handled, the method to be hereinafter described is advantageous in that the metal to be welded becomes stiffened and more self-supporting. This method of handling such materials will now be described in connection with Figures 3 and 4 of the drawing.

Thus referring to Figure 3, drum or mandrel 20 is provided. This drum is of suitable material such as steel, copper, quartz or glass. The drum has a centrally disposed annular groove 21 which corresponds generally to channel 4 in the apparatus shown in Figures 1 and 2. Drum 20 is provided with hubs 22 so that the drum may be mounted in journals for rotation. One or both of these hubs are hollowed to provide gas inlet 23, leading to the interior of drum 20. Suitable apertures in the cylindrical wall of the drum at annular groove 21 are provided so that a gas path from the interior of the drum to the exterior of the drum along channel 21 is provided. This drum may be constructed from a number of parts and bolted or welded or otherwise joined together to provide a rigid structure.

Sheets 24 and 25 to be welded are wrapped around the drum on opposite sides of annular groove or channel 21, the abutting edges of sheets 24 and 25 lying over channel 21. Sheets 24 and 25 are clamped tightly by straps 26, the sheets as curved being thereby stiffened substantially. By having clamping bands 26 tightly drawn, the pressure upon the sheets may be made great enough to overcome the tendency of one sheet to climb over and overlap the edge of the other sheet.

Figure 4:
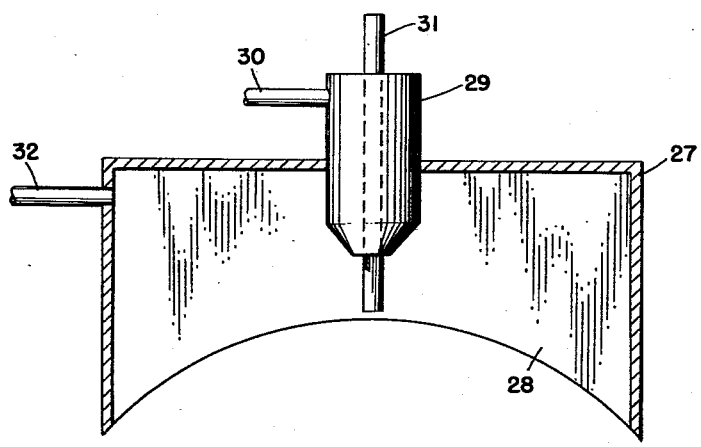
Figure 4 is a view, partly in section, of the hood and welding electrode for use with the apparatus shown in Figure 3.

With the rotary welding jig shown in Figure 3, a stationary electrode and hood construction as shown in Figure 4 may be used. Hood 27 of suitable material such as iron, copper, quartz or glass has curved end walls 28 conforming to the curvature of the part upon which the hood will ride. Thus curved walls 28 may ride on sheets 24 and 25 on the inside or the outside of bands 26, or may ride upon drum 20. Electrode-holder 29, corresponding to holder 9 of Figure 1, is provided, this holder being secured in the top wall of the hood. Electrode-holder 29 has gas inlet 30 and accommodates electrode 31. Hood 27 is provided with gas inlet 32.

Hood 27 should be large enough, both along the axis of drum 20 and circumferentially of drum 20, to contain not only the weld region in the neighborhood of the arc but also the finished hot weld in an inert atmosphere. Thus, in certain instances, it may be desirable to have hood 27 extend completely around the drum. Clamping bands 26 should be spaced a sufficient distance from the weld so that no possibility of contamination from these bands can occur. In some instances, it may be desirable to make these bands of tantalum.

The conditions with regard to nature of electrode material, nature of inert atmosphere and the handling thereof, are all similar to the conditions in the method disclosed in connection with Figures 1 and 2. In the case of butt welding of pipe, it will be necessary to introduce inert gas at hub 22 through a suitable pipe extending within the length of one of the pipes being welded. However, it is also possible to introduce the inert gas within drum 20 at an aperture at the cylindrical wall of the drum and feed such gas through a flexible pipe or hose. Inasmuch as such a jig will generally be used for angles of 360 degrees or less, such an arrangement of feeding gas may be used. The inert gas may also be introduced by using one of the pipe lengths being welded as a supply pipe.

It is also possible to have continuous line welding by providing a pair of drums in rolling contact on opposite sides of sheets 24 and 25. In such case, sheets 24 and 25 may be fed either straight as shown in Figure 1 or curved as shown in Figure 3. In the latter case, the curvature of the sheets at the weld point will tend to stiffen both sheets. The entire mechanism for thus holding the sheets in position may be immersed in an inert atmosphere or a suitably shaped enclosure may be provided for enveloping in an inert atmosphere only the tantalum which is above about 400 degrees C.

It is understood that suitable automatic electrode feeding means for maintaining a substantially constant gap at the arc may be provided. The desirability of direct current and polarity, as previously indicated, applies equally well for the method of handling the sheets as illustrated in Figure 3 as in connection with Figures 1 and 2.

The general method of welding tantalum is applicable to the manufacture of tantalum tube or pipe. Tantalum tube or pipe may be used under conditions where extreme temperatures are encountered. Under such conditions, substantial stresses and strains are generated in pipe. Unless the metal at the weld is as tough, ductile and strong as the remaining pipe metal and has substantially the same physical characteristics as the remaining pipe metal, serious distortion of the pipe may occur. If the weld at the pipe under such conditions is weaker than the body of the metal, then the weld may open at this region and destroy the pipe. It is clear, therefore, that there will be little or no advantage to the use of welded tantalum pipe or tube under conditions where tantalum must be used, if the seam or weld is not as strong and as reliable as the body of the pipe. In order to make such seamed tube or pipe out of sheet tantalum, a continuous line welding method is used. This method will now be described in connection with Figures 5 to 7 inclusive.

Referring to these figures, the apparatus with which the continuous line welding method may be used comprises base 45 upon which there is rigidly secured die block 46. Die block 46 is of suitable metal such as iron, steel, copper or any suitable alloy, or of quartz or glass, and has bed or channel 47 therein upon which the lower portion of the tantalum pipe material rests.

Die block 46 has longitudinal channel or open region 48 along which there is ample clearance for the pipe weld to lie. As is true of the methods previously described, it is necessary in the case of tantalum pipe welding to have the opposed tantalum metal edge portions clear of all other material and self-supporting so long as the tantalum is at a sufficiently high temperature to alloy with or be contaminated by other materials. It follows, therefore, that the clearance on both sides of the seam line at the pipe will depend in a measure upon how well the heat is dissipated. Thus if die block 46 is of metal having high heat conductivity, and if the die block is provided with radiating fins or adequate cooling facilities, then heat conduction from the hot tantalum may be sufficient so that the clearances transversely of the seam line need not be great. However, since the metal is curved and has substantial strength, adequate support for the metal and pipe in the neighborhood of the weld region, and for a distance beyond, may be provided by simply having a curved channel upon which the lower half of the pipe may be supported.

Die block 46 has hold-down block 49 attached thereto and extending across the opposed tantalum metal edges and in advance of the welding electrode and welding region. Block 49 is of suitable material as metal or quartz or glass and has bottom face 50 provided with a central rib 50a extending down between the opposed pipe blank edges, so that the tantalum metal for forming the pipe seam may be maintained in predetermined position preparatory to welding. Block 49 is sufficiently removed from the weld point so that contamination of the tantalum from the block will not occur.

Ahead of hold-down block 49, in the direction of travel of the pipe, is aligning fin or blade 51 supported by block 52. Aligning fin 51 consists of a thin blade of metal such as steel and extends downwardly through the gap between the opposed separated edges 55a and 55b of pipe metal blank 55. Fin 51 functions to maintain the opposed tantalum metal edges in predetermined relative spaced position in preparation for welding, the thickness of the blade being such as to guide the opposed metal edges at an angle toward the welding region. As in Figure 1, the angle is small, being about 1 degree for thin tantalum stock.

Disposed inside of pipe blank 55 and located at a suitably cool spot, as between aligning fin 51 and hold-down block 49, is piston 53 of suitable construction. Thus this piston may consist of flexible element 54 of metal such as copper, or of asbestos or other material depending upon the temperature, clamped between nuts 54a and 56 threaded on pipe 57. Pipe 57 extends for a distance in advance of the welding region and is adapted to be supplied with inert gas. The inert gas within pipe 57 is discharged from end 57a of the pipe within the tantalum pipe blank. The pressure of the inert gas is sufficient to purge the interior of the pipe blank up to and beyond the welding region of impurities in a manner similar to the methods previously described. It will be understood that piston 53 is stationary with respect to die block 46 during the normal welding operation and that pipe blank 55 is fed from left to right as seen in Figure 5.

Disposed over the top of die block 46 is welding hood 58 having a generally cylindrical shape but having the end thereof complementarily shaped to cooperate with the die block to provide a generally closed region for the pipe blank. Hood 58 may be of any suitable material such as metal or glass. Piston 53 is shown as just below the edge of hood 58 so that inert gas escaping up through the short length of unwelded pipe will go into the hood. Suitably supported within hood 58 is electrode-holder 59 which may be generally similar to holder 29 in Figure 4. Hood 58 and holder 59 have inlets 58a and 60 for inert gas and holder 59 insulatingly supports welding electrode 62. Electrode 62 extends axially of holder 59, the electrode projecting beyond throat 63 to a point just above the surface of the pipe metal. Assuming that a suitable arc has been initiated between the electrode and tantalum pipe blank as previously described, opposed edges 55a and 55b of tantalum will be welded below the tip of electrode 62. Means not shown will move the pipe blank at a steady rate past the welding region.

In order to protect the part of the welded pipe, which is still hot, from damage by contamination with either gas or solid material, ring portion 70 of the die block is formed to provide a completely sealed region around the pipe. Carried by ring portion 70 of the die block is hose 71 of suitable flexible material such as asbestos cloth or metal foil. Hose 71 has its end 72 provided with washer 73 through which the cooled end of the formed pipe may pass. The atmosphere within hose 71 will be inert and inlet pipe 75 is provided for this purpose.

The inert gas supplied through the various pipes will leak out to atmosphere through the end of the completed pipe, around the outside of the completed pipe at the washer for hose 71 and through the gap in the metal in the pipe blank just ahead of the welding region. It is preferred to have the welded pipe fit loosely within the die block 46 and ring part 70. There may be clearance between the shield edge and top part of the welded pipe. Thus, any space between the outside of shield 58 and ring portion 70 will be filled by leaking inert gas so that the hot tantalum will still remain protected. It is possible to omit either or both of inert gas pipes 60 and 75 and rely upon leakage to maintain the inert atmosphere within head 58 and hose 71.

Supporting standard 76 and sheet 76a are provided for supporting gas feed pipe 57. Successive lengths of pipe blanks may be fed through and adjacent pipe ends may then be welded as previously described, to form endless pipe of desired size and thickness.

It will be clear that the hot tantalum will be fully protected by an inert atmosphere on both sides of the metal. The maintenance of a slowly moving inert atmosphere is as necessary in the pipe welding method as in the methods for sheet welding.

In all cases where tantalum is being welded, the region containing any tantalum to be heated will be purged of contaminating gases and vapors and will be filled with an inert atmosphere. This inert atmosphere will move through the welding region so that gaseous impurities will be removed from the welding region and discharged. The moving inert atmosphere should be provided before the arc has been initiated and after the arc has been extinguished so that the tantalum will be heated, will remain hot and will be cooled in an inert atmosphere down to a safe temperature below about 400 degrees C.

In general, the nature of the inert atmosphere for making tantalum pipe, inert electrode and welding current supply are all similar to the corresponding factors in the preceding methods.

Referring now to Figure 8, there is shown a length of tantalum tube 80 having welded seam 81. As with the weld shown in Figure 2A, the metal at seam 81 is dense, tough, ductile and homogeneous. The thickness of the wall at the seam is slightly greater than the remaining wall thickness.

Complex welds are also possible by the method described here. Thus one pipe may have its end welded into another pipe to form a T or V. In such case, the opposing metal edges must be prepared so that they complement each other. By having good matching of edges to be welded, the methods of welding described before may be readily adapted to obtain good results, both structurally and appearance-wise.

The apparatus disclosed herein is described and claimed in my copending application entitled, Apparatus For Arc Welding, filed of even date herewith, Serial No. 265,689, now abandoned.

What is claimed is:

1. A method of welding members of a refractory metal, which comprises: supporting the metal members at regions sufficiently remote from the edges thereof to be welded so that the portions to be heated above the temperature at which the refractory metal is susceptible to contamination from solids are free from contact with solids during welding and while said portions are above the contaminating temperature; positioning the edges of the metal members to be welded so that during welding the edge portions being melted at the weld region are sufficiently close together to maintain a self-supporting capillary molten pool, but avoiding pressing the edges to be welded towards each other by an externally applied force; enveloping in an inert atmosphere all metal surfaces hot enough to be susceptible to contamination from gases; initiating and maintaining during welding an electric arc in space between an electrode and a weld region of the metal members to be welded, the electrode being relatively stable under operating conditions and the condition of the arc producing a self-supporting molten pool between the metal members to be welded; causing relative movement between the electrode and the members to be welded along a weld line defined by the opposed edges to be welded while maintaining said arc to weld the edges; and introducing an inert gas into the weld region during welding from points above and below the metal portion being welded, the velocity of flow of said inert gas preventing both chilling of the molten pool and ingress of air while washing away from the heated surfaces of the members any oxidizing gases formed during welding.

2. The method set forth in claim 1 wherein the refractory metal members to be welded are tantalum.

3. The method as set forth in claim 1 wherein the electric arc is a direct current type arc.

4. A method of producing a weld between edges of tantalum metal members, which comprises: supporting the tantalum members at regions sufficiently remote from the edges to be welded so that the portions to be heated above the temperature at which the tantalum is susceptible to contamination from solids are free from contact with solids during welding and while said portions are above the contaminating temperature; positioning the edges of the tantalum members to be welded so that during welding the edge portions being melted at the weld region are sufficiently close together to maintain a self-supporting capillary molten pool, but avoiding pressing the edges to be welded towards each other by an externally applied force; enveloping all tantalum metal surfaces having a temperature of at least about 400° C. in an inert atmosphere; initiating and maintaining during welding an electric arc in space between an electrode and a weld region of the tantalum members to be welded, the electrode being relatively stable under operating conditions and the condition of the arc producing a self-supporting molten pool between the tantalum members to be welded; causing relative movement between the electrode and the tantalum members to be welded along a weld line defined by the opposed edges to be welded while maintaining said arc to weld the edges; and introducing an inert gas into the weld region during welding from points above and below the metal portion being welded, the velocity of flow of said inert gas preventing both chilling of the molten pool and ingress of air while washing away from the heated surfaces of the tantalum members any oxidizing gases formed during welding.

5. The method set forth in claim 4 wherein the inert gas is helium and the rate of flow of said gas is between about ½ and about 2½ cubic feet per second.

6. The method as set forth in claim 4 wherein the electric arc is a direct current type arc.

7. A method of forming a refractory metal tube from a tubular shaped member having opposed edges to be welded to form said tube, which comprises: supporting said tubular shaped metal member at regions sufficiently remote from the edges thereof to be welded so that the portions to be heated above the temperature at which the refractory metal is susceptaible to contamination from solids are free from contact with solids during welding and while said portions are above the contaminating temperature; positioning said edges of the tubular shaped metal member to be welded so that during welding the edge portions being melted at the weld region are sufficiently close together to maintain a self-supporting capillary molten pool, but avoiding pressing the edges to be welded towards each other by an externally applied force; enveloping in an inert atmosphere all metal surfaces hot enough to be susceptible to contamination from gases; initiating and maintaining during welding an electric arc in space between an electrode and a weld region of the tubular shaped metal member to be welded, the electrode being relatively stable under operating conditions and the condition of the arc producing a self-supporting molten pool between the metal edges to be welded; causing relative movement between the electrode and the tubular shaped member to be welded along a weld line defined by the opposed edges to be welded while maintaining said arc to weld the edges; and introducing an inert gas into the weld region during welding from points above and below the metal portion being welded, the velocity of flow of said inert gas preventing both chilling of the molten pool and ingress of air while washing away from the heated surfaces of the tube any oxidizing gases formed during welding.

References Cited in the file of this patent

UNITED STATES PATENTS

| | | |
|---|---|---|
| 1,605,071 | Ronci | Nov. 2, 1926 |
| 1,622,251 | Nelson | Mar. 22, 1927 |
| 1,749,765 | Hendrickson | Mar. 11, 1930 |
| 1,948,801 | Riemenschneider | Feb. 27, 1934 |
| 2,141,021 | Rooke | Dec. 20, 1938 |
| 2,160,586 | Gettig | May 30, 1939 |
| 2,163,209 | Pungel | June 20, 1939 |
| 2,179,176 | Dunn | Nov. 7, 1939 |
| 2,240,627 | Riemenschneider | May 6, 1941 |
| 2,246,579 | Ewertz | June 24, 1941 |
| 2,274,631 | Meredith | Feb. 24, 1942 |
| 2,288,433 | Boetcher | June 30, 1942 |
| 2,339,403 | Hess | Jan. 18, 1944 |
| 2,422,305 | Kopec | June 17, 1947 |
| 2,433,296 | Schaefer | Dec. 23, 1947 |
| 2,444,778 | Kopec | July 6, 1948 |
| 2,496,188 | Wiese | Jan. 31, 1950 |
| 2,576,793 | Jordan | Nov. 27, 1951 |
| 2,590,084 | Bernard | Mar. 25, 1952 |